(12) United States Patent
Fisher et al.

(10) Patent No.: US 7,630,929 B1
(45) Date of Patent: Dec. 8, 2009

(54) PLANNING WITHDRAWALS FROM FINANCIAL ACCOUNTS

(75) Inventors: Stephen D. Fisher, Belmont, MA (US); Jonathan F. Weed, Stoughton, MA (US); Viswanathan Venugopala, Westford, MA (US)

(73) Assignee: FMR Corp., Boston, MA (US)

( * ) Notice: Subject to any disclaimer, the term of this patent is extended or adjusted under 35 U.S.C. 154(b) by 778 days.

(21) Appl. No.: 10/971,888

(22) Filed: Oct. 22, 2004

Related U.S. Application Data

(63) Continuation-in-part of application No. 10/969,363, filed on Oct. 20, 2004, now abandoned.

(51) Int. Cl.
*G06Q 40/00* (2006.01)
(52) U.S. Cl. .......................................... 705/36; 705/37
(58) Field of Classification Search ...................... 705/1, 705/36, 37, 35, 4, 2, 40, 38; 709/219; 435/5, 435/6; 365/243
See application file for complete search history.

(56) References Cited

U.S. PATENT DOCUMENTS

| | | | | |
|---|---|---|---|---|
| 5,878,405 | A * | 3/1999 | Grant et al. | 705/35 |
| 6,687,681 | B1 * | 2/2004 | Schulz et al. | 705/36 T |
| 7,016,873 | B1 * | 3/2006 | Peterson et al. | 705/36 R |
| 2003/0097324 | A1 * | 5/2003 | Speckman | 705/36 |

OTHER PUBLICATIONS

Cynthia Harrington, CFA, "Tax-Sensitive Portfolios-Getting an Edge on Uncle Sam", www.horsesmouth.com/linkpo/72109.htm, pp. 1-5, Feb. 11, 2003.
Still River Retirement Planning Software, Inc., "Strategies for Liquidating Assets at Retirement", www.StillRiverRetire.com, pp. 1-4, Feb. 20, 2003.

* cited by examiner

*Primary Examiner*—Mary Cheung
*Assistant Examiner*—John H Holly
(74) *Attorney, Agent, or Firm*—Fish & Richardson P.C.

(57) ABSTRACT

A method for selecting among taxable accounts, non-deductible tax-deferred accounts, deductible tax-deferred accounts, and tax-exempt accounts from which to withdraw funds to minimize tax consequences prioritizes withdrawal from taxable accounts and non-deductible tax-deferred accounts over withdrawal from deductible tax-deferred accounts and tax-exempt accounts. The method also prioritizes between taxable accounts and non-deductible tax-deferred accounts by comparing (i) a future after-tax liquidation value of assets held in taxable and non-deductible tax-deferred accounts assuming withdrawals are made from the taxable accounts prior to a withdrawal from the non-deductible tax-deferred accounts and (ii) a future after-tax liquidation value of assets held in taxable and non-deductible tax-deferred accounts assuming withdrawals are made from the non-deductible tax-deferred accounts prior to a withdrawal from the taxable accounts.

30 Claims, 3 Drawing Sheets

PLANNING WITHDRAWALS FROM FINANCIAL ACCOUNTS

CLAIM OF PRIORITY

This application is a continuation-in-part of U.S. patent application Ser. No. 10/969,363, filed Oct. 20, 2004 now abandoned, entitled "Planning Withdrawals From Financial Accounts", to Stephen D. Fisher, Jonathan E Weed and Viswanathan Venugopala, the entire contents of which are incorporated herein by reference.

TECHNICAL FIELD

This disclosure relates to choosing accounts from which to withdraw funds.

BACKGROUND

Under United States federal income tax laws, individuals may establish the following four types of accounts from which they can withdraw proceeds to fund their retirement: taxable accounts, deductible tax-deferred accounts, non-deductible tax-deferred accounts, and tax-exempt accounts.

A taxable account, such as a conventional brokerage account, is an account that is funded with after-tax dollars (i.e., income that was previously subject to income tax), and earnings (e.g., interest, capital gains, dividends) are taxed in the year that they are realized at either ordinary income or capital gains rates.

A deductible tax-deferred account, such as a deductible Individual Retirement Account (IRA), 401(k) account or non-qualified deferred compensation account, is an account that is funded with pre-tax dollars (i.e., income that was not previously subject to income tax), and contributions and earnings are taxed, at ordinary income rates, only when they are withdrawn from the account.

A non-deductible tax-deferred account, such as a traditional non-deductible IRA or variable annuity, is an account that is funded with after-tax dollars, but earnings are taxed, at ordinary income rates, only when they are withdrawn from the account.

A tax-exempt account, such as a Roth IRA, is an account that is funded with after-tax dollars, and earnings are never taxed. Thus, a withdrawal from a tax-exempt account is completely tax-free.

The tax basis ("basis") of an asset is the cost from which gains or losses are calculated for federal income tax purposes. Assets held in a taxable account generally have a basis equal to their purchase price, including any costs associated with purchasing the assets (e.g., brokerage fees). Assets in a non-deductible tax-deferred account have a basis equal to the contributions to the account (on which the account holder has already paid income tax) plus costs associated with purchasing assets in the account (e.g., brokerage fees). Assets held in a deductible tax-deferred account do not have a basis, and the entire amount of funds withdrawn from the account will be taxed as ordinary income. Assets held in a tax-exempt account are withdrawn completely tax free; the concept of basis therefore effectively is not applicable to this type of account (alternatively, the account can be viewed as having a basis equal to its fair market value).

Basis is created in a taxable account each time securities are purchased. Each purchase of securities therefore is said to create a separate "tax lot" that reflects the basis (and holding period) of those securities. For example, if an individual paid $100 to purchase 10 shares of ABC stock in a taxable account and later paid $200 to purchase an additional 10 shares of ABC stock in the same (or another) taxable account, the initial purchase would give rise to a tax lot with a basis of $10 per share and the subsequent purchase would give rise to a tax lot with a basis of $20 per share. Alternatively, if the securities in question were shares of a mutual fund, the individual could elect to take the average cost of all of the shares and create a single tax lot with a basis of $15 per share.

Basis is also created in a non-deductible tax-deferred account each time contributions are made to the account. A non-deductible tax-deferred account, however, is not divided into multiple tax lots. Instead, all of the securities in all of an individual's non-deductible tax-deferred accounts are treated as a single tax lot, and the basis allocated to a distribution from a non-deductible tax-deferred account is equal to (1) the pre-distribution basis to value ratio of the individual's non-deductible tax-deferred accounts in aggregate (i.e., the aggregate basis of all such accounts is divided by the aggregate value of all of such accounts), multiplied by (2) the amount of the distribution. For example, if the individual in the hypothetical immediately above held the ABC stock in more than one non-deductible tax-deferred account (rather than in a taxable account) and sold 4 shares when each share was worth $25, thereby generating a $100 distribution, the basis allocated to that distribution would equal (1) the aggregate basis of all of the ABC stock held by the individual ($300) divided by the aggregate value of that stock ($500) multiplied by (2) the amount of the distribution ($100); thus, the basis allocated to the distribution would be $60.

If the value of a distribution from a non-deductible tax-deferred account exceeds its allocable basis, the difference is taxable as ordinary income. If the value of a distribution from a non-deductible tax-deferred account is less than its basis, the distribution is not taxable but generally does not give rise to a loss. Instead, an individual may claim a loss with respect to a non-deductible tax-deferred account only at the time all such accounts owned by the individual are fully liquidated and only to the extent that the aggregate distributions from all of the accounts over time were less than the aggregate bases of all of the accounts. Any such loss is treated as an ordinary loss that is subject to the 2% floor on miscellaneous itemized deductions.

The concept of multiple tax lots also is not applicable to the deductible tax-deferred account and tax-exempt account.

An individual typically withdraws money from one or more of the four types of account to fund his or her retirement and therefore needs to prioritize among the accounts by creating a withdrawal hierarchy. In some cases, non-tax factors (e.g., the need to maintain an appropriate mix of asset classes such as stocks, bonds and cash) may dictate the account from which the withdrawal should be made. In other cases, however, withdrawing proceeds in the most tax-efficient manner will be the deciding factor.

For some types of accounts, current law requires a minimum withdrawal over the course of a tax year after an individual reaches a certain age. This amount is referred to conventionally and in this document as a "minimum required distribution" (MRD).

SUMMARY

To maximize federal income tax efficiency, an individual should use the MRD as the first source of proceeds for funding retirement. Next, an individual should liquidate tax lots in the taxable account that have bases greater than their fair market value, since such liquidations will not generate taxable gain and will create losses that will offset future gains.

Finally, an individual should liquidate securities in the non-deductible tax-deferred account(s) if the aggregate pre-distribution basis of these accounts is greater than the aggregate value of these accounts (such distributions will not be taxable but, unlike the liquidation of securities with built-in loss in the taxable accounts, will not give rise to a loss that is available to offset against gains from other securities (assuming any loss on the complete liquidation of all non-deductible tax-deferred accounts does not exceed the 2% floor on miscellaneous itemized deductions—this is why loss securities in the taxable account are liquidated first).

After taking the MRD and liquidating securities in the taxable and non-deductible tax-deferred accounts as described above, an individual still may need to withdraw additional funds from accounts. In this case, a method for selecting among remaining accounts (i.e., taxable accounts, non-deductible tax-deferred accounts, deductible tax-deferred accounts, and tax-exempt accounts) prioritizes withdrawal from taxable accounts and non-deductible tax-deferred accounts over withdrawal from deductible tax-deferred accounts and tax-exempt accounts. The method also prioritizes between taxable accounts and non-deductible tax-deferred accounts by comparing (i) a future after-tax liquidation value of assets held in taxable and non-deductible tax-deferred accounts assuming one or more withdrawals are made from the taxable accounts prior to a withdrawal of funds from the non-deductible tax-deferred accounts and (ii) a future after-tax liquidation value of assets held in taxable and non-deductible tax-deferred accounts assuming one or more withdrawals are made from the non-deductible tax-deferred accounts prior to a withdrawal of funds from the taxable accounts.

The details of one or more embodiments of the invention are set forth in the accompanying drawings and the description below. Other features, objects, and advantages of the invention will be apparent from the description and drawings, and from the claims.

DETAILED DESCRIPTION

When an individual reaches retirement, he or she often draws on his or her assets to obtain a specific amount of after-tax proceeds over the course of a particular time horizon (e.g., $60,000 over 12 months). Because the federal income taxes applicable to withdrawals from the different types of accounts differ according to account type and the basis (if any) of assets held within the account, different pre-tax amounts will need to be withdrawn from different accounts to achieve the target amount of after-tax proceeds. In addition, the decision to withdraw money from one account can be viewed as a decision to leave money in the other accounts. This means, in effect, that selecting an account from which to liquidate assets involves deciding whether to invest more money at a lower after-tax rate of return or invest less money at a higher after-tax rate of return.

For example, if an individual wants to receive $60,000 of after-tax proceeds, he or she could withdraw $60,000 from a tax-exempt account such as a Roth IRA. Alternatively, the person could withdraw $92,308 from a deductible tax-deferred account assuming a tax rate of 35% (i.e., $92,308×(1-35%)=$60,000). Thus, the person has a choice to (i) withdraw the larger amount (i.e., $92,308) from the deductible tax-deferred account first, and allow $60,000 to remain invested and accumulate value untaxed at some rate of return (e.g., 10%), or (ii) withdraw the smaller amount (i.e., $60,000) from the tax-exempt account, and allow $92,308 to remain invested and accumulate taxable value at some possibly lower effective rate of return (e.g., 6.5%=10%×(1-35%) where 35% is the income tax rate). When a person has multiple types of accounts (i.e., taxable accounts, non-deductible tax-deferred accounts, deductible tax-deferred accounts, and tax-exempt accounts), some having basis and multiple tax lots, deciding which account(s) and tax lot(s) to liquidate can be complicated.

Figure 1:
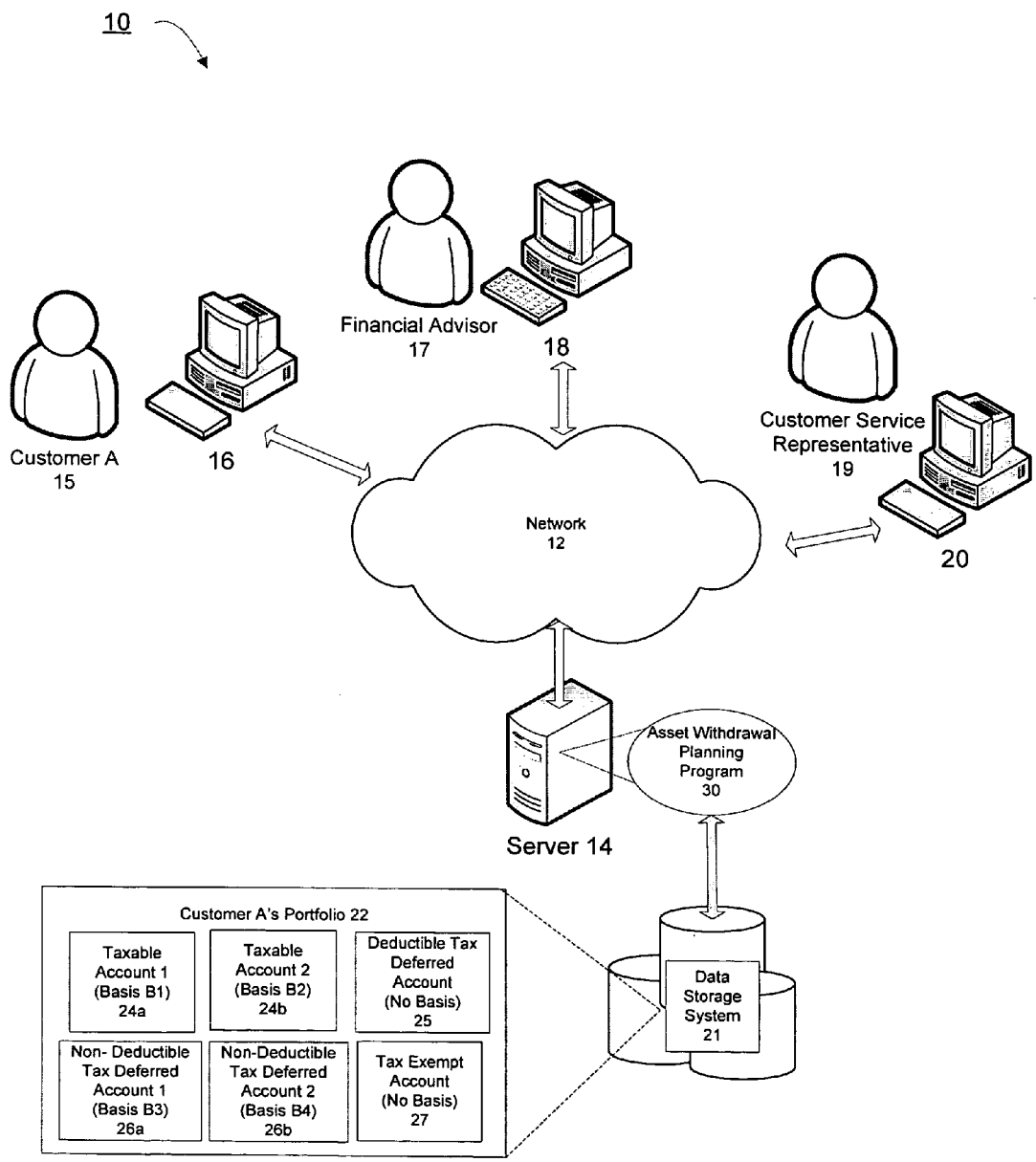
FIG. 1 is a diagram of a system for selecting accounts from which to withdraw funds.

As shown in FIG. 1, a system 10 includes an asset withdrawal planning program 30 that may be utilized by a customer 15, a financial advisor 17 or a customer service representative 19 to assist the customer 15 in deciding from which account or accounts and, if applicable, from which tax lot or tax lots to withdraw funds at any particular time.

The system 10 includes a network 12, such as the Internet, connecting a server 14, a customer client computer 16 accessed by the customer 15 (e.g., customer A), a financial advisor client computer 18 accessed by the financial advisor 17, and/or a customer service representative computer 20 accessed by a customer service representative 19. While both a customer service representative and financial advisor are able to execute the asset withdrawal planning program 30 for a customer, a customer service representative only assists a customer in making his or her own investment decisions, but does not give financial advice to or make investment decisions on behalf of a customer. By contrast, a financial advisor makes investment decisions on behalf of the customer and provides financial advice and recommendations to the customer.

The server 14 is in communication with a data storage system 21, such as a storage area network (SAN) or network-attached storage (NAS), which stores information about a portfolio 22 of accounts owned by the customer 15. In this particular example, the customer 15 owns accounts in each of the four current categories of retirement accounts: two taxable accounts 24a-24b, one deductible tax-deferred account 25, two non-deductible tax-deferred accounts 26a-26b, and one tax-exempt account 27. The two taxable accounts have a basis, one with a basis of B1 and the other with a basis of B2. Basis B1 and B2 are subdivided into multiple tax lots. The two non-deductible tax-deferred accounts 26a-26b also have a basis, one with a basis of B3 and the other with a basis of B4. Basis B3 and B4 are not subdivided into multiple tax lots; rather, the basis allocated to a distribution from non-deductible tax-deferred account 26a or 26b is equal to (1) the pre-distribution basis to value ratio of non-deductible tax-deferred accounts 26a and 26b in aggregate, multiplied by (2) the amount of the distribution. The concept of basis is not applicable to the deductible tax-deferred account 25 and the tax-exempt account 27.

Because a customer's portfolio of accounts may be spread across multiple financial institutions, the system 10 may employ an account aggregation system, such as the iFinity Platform by Yodlee, Inc. (www.yodlee.com), to obtain data about a customer's portfolio from multiple financial institutions.

In this particular implementation, the asset withdrawal planning program 30 is resident within the server 14, which is accessible to the customer, financial advisor, and customer service representative via customer computer 16, financial advisor computer 18, and customer service representative computer 20, respectively. In other embodiments, an asset withdrawal planning program may be resident on other computer systems accessible to the customer, financial advisor and/or customer service representative, such as customer computer 16, financial advisor computer 18, customer service representative computer 20, and/or another computing device on the network 12. Additionally, an asset withdrawal planning program need not be a stand-alone computer program but may be integrated as part of a larger software application.

Figure 2:
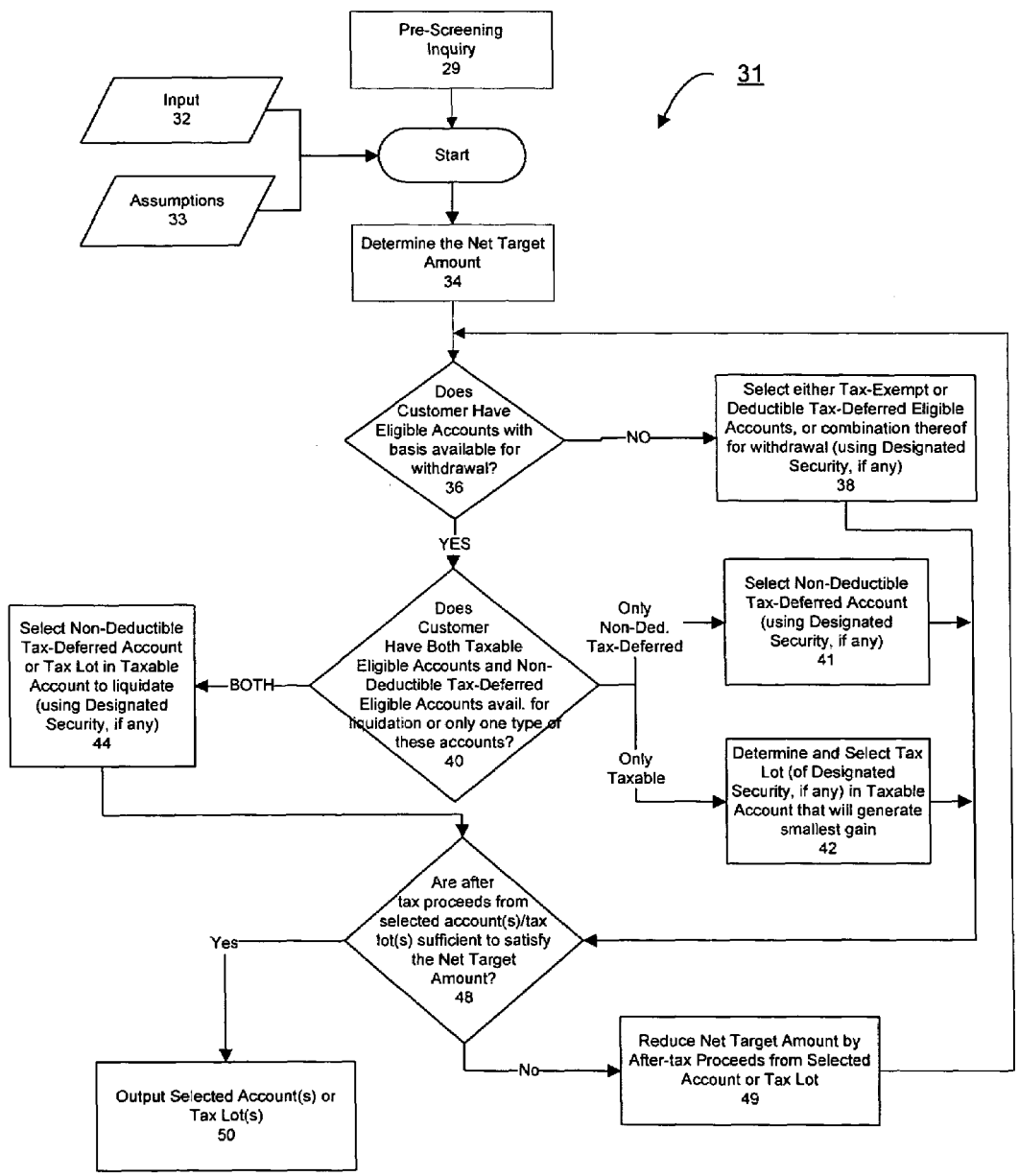
FIG. 2 is a flowchart of a process for selecting accounts from which to withdraw funds.

Referring to FIG. 2, in a preferred implementation, a customer, financial advisor or customer service representative engages a customer in a pre-screening inquiry 29 to determine if an asset withdrawal planning program (i.e., program 30 shown in FIG. 1) is appropriate for the customer. In the pre-screening inquiry 29, for example, a customer service representative or financial advisor may ask the customer a series of scripted questions to ensure that the customer does not have issues (e.g., estate planning issues) that the program 30 will not take into account.

Assuming the pre-screening inquiry 29 indicates that the asset withdrawal planning program 30 is appropriate for the customer, the customer, financial advisor, customer service representative, or other user initiates the asset withdrawal planning program 30 (shown in FIG. 1), which uses a withdrawal selection process 31 shown in FIG. 2.

The withdraw selection process 31 receives input 32 about accounts owned by the customer, including the type of account (e.g., taxable, deductible tax-deferred, non-deductible tax-deferred, tax-exempt), the current value of the account, and the basis, if any, for the account, broken down (where applicable) into individual tax lots. The input also includes information regarding any capital loss carryforwards ("CLCs") that the customer has available to offset realized gains in the taxable account. The input 32 also includes a tax rate for ordinary income (e.g., 35%) and capital gains (e.g., 15%), as well as data indicating the specific amount of after-tax proceeds the customer would like to withdraw to meet his or her financial needs for a particular time period such as a year (i.e., the "Target Amount"). The input also includes an option for a user to specify one or more designated securities (each, a "Designated Security") that indicates a particular security (e.g., ABC common stock) or class of securities (e.g., equities, foreign equities, bonds, high yield bonds, large cap equity mutual funds, etc.) that a customer wants to liquidate first because, for example, the customer believes his or her portfolio to be overweighed in that particular security. If a user specifies a Designated Security, the process 31 will analyze only accounts holding the Designated Security in determining the account(s) from which securities should be liquidated (although if any one non-deductible tax-deferred account holds a Designated Security, the value and basis of all non-deductible tax-deferred accounts will need to be considered regardless of whether they contain a Designated Security). Accounts which contain a Designated Security are referred to as "Eligible Accounts". If the user does not specify a Designated Security, then all of the customer's accounts are considered by process 31 to be Eligible Accounts. A customer that selects multiple Designated Securities prioritizes the order in which they should be liquidated.

In addition to receiving the input 32, process 31 also includes a set of assumptions 33 that are used to select one or more accounts from which to withdraw funds. Some or all of the assumptions may be pre-programmed and not readily changeable by the user (e.g., the customer, financial advisor, etc.), or they may be configurable by the user through, for example, a graphical user interface. In this particular implementation, the process 31 uses the following set of assumptions:

Assume a liquidation strategy that will minimize United States federal income tax liability, ignoring effect of any applicable state or other taxes (including estate and gift tax).

Assume that the relative differences in risk and rate of return—including the portion of the return that is attributable to unrealized gains, the portion that is attributable to realized taxable ordinary income and the portion that is attributable to realized capital gains—of investments held in the portfolio may be ignored.

Assume that when securities in the taxable account are sold at a gain, the gain will be long-term capital gain rather than short-term capital gain.

Assume that the tax rates (which are part of the input 32) stay constant in the future.

Assume that for the taxable account, amounts giving rise to currently taxable income and gains are reinvested on an after-tax basis.

Assume that each account will appreciate over time.

Assume that withdrawals from accounts other than the taxable account are not subject to any penalties (e.g., for premature withdrawal or, in the case of a Roth IRA, for failure to meet the 5-year holding period requirement).

Assume that there are no transaction costs (e.g., redemption fees) applicable to sales and reinvestments.

Assume that losses attributable to non-deductible tax-deferred accounts do not exceed the 2% floor on miscellaneous itemized deductions under current U.S. federal income tax law.

After receiving the input 32 and any changes to the default set of assumptions 33, the withdrawal selection process 31 determines (34) the "Net Target Amount." The Net Target Amount is the Target Amount (which is input by the user) reduced by the following: first, any MRDs; second proceeds from sales of securities (starting with the Designated Security in cases in which one has been input) in the taxable account that will generate a capital loss; and third, proceeds from sales of securities (starting with the Designated Security in cases in which one has been input) in the non-deductible tax-deferred account(s) if the resulting distribution will not be taxable (i.e., if the aggregate basis of these accounts exceeds their aggregate value).

In a preferred implementation, the user manually inputs the MRDs and process 31 automatically scans the customer's accounts to identify loss securities. In this implementation, process 31 also subtracts the MRDs and proceeds from sales of securities as set forth above to determine the Net Target Amount. In other implementations, a customer, financial advisor or customer service representative manually computes the Net Target Amount and inputs it into process 31.

Assuming that the Net Target Amount is greater than zero (indicating that the customer still needs to withdraw finds from one or more accounts to attain the Target Amount), process 31 examines the customer's account information to determine (36) whether the customer has any Eligible Accounts with basis that are available for withdrawal. If the program determines that there are no such accounts available, it selects (38) either a tax-exempt or deductible tax-deferred Eligible Account, or some combination thereof as the account from which securities should be liquidated to generate proceeds sufficient to satisfy the Net Target Amount on an after-tax basis. Process 31 will select any Designated Securities first for liquidation, but if such securities generate insufficient proceeds or there are no Designated Securities, process 31 will either select other securities for liquidation or require the customer or financial advisor to make such selection. In order to determine the value of a security held in an account, process 31 has access to real-time market pricing of securities.

As will be explained in more detail below, there is no difference between withdrawing amounts from a tax-exempt account versus a deductible tax-deferred account from purely the perspective of trying to maximize total after-tax proceeds. Additional processes, however, may be used to prioritize among accounts having no taxable basis such as expectations about future tax rates.

Referring again to FIG. 2, if the customer has one or more Eligible Accounts with basis available for liquidation, the process 31 determines (40) if the customer has both taxable and non-deductible tax-deferred Eligible Accounts available for liquidation or only one type of these accounts. If the customer has only one or more non-deductible tax-deferred accounts, the process will select (41) Designated Securities in the non-deductible tax-deferred Eligible Account(s), but if such securities generate insufficient proceeds or there are no Designated Securities, process 31 will either select other securities in the non-deductible tax-deferred account(s) for liquidation or require the customer of financial advisor to make such selection. If the customer has only one or more taxable Eligible Accounts, the process 31 will select (42) the tax lot (of the Designated Security, if any) in the taxable Eligible Account that will generate the smallest gain.

If the customer has both a taxable and non-deductible tax-deferred eligible (or more than one of each type of account) accounts available for liquidation, the process 31 determines (44) whether to liquidate a tax lot in the taxable account or to liquidate securities in the non-deductible tax-deferred account. This selection process is described in more detail below in connection with FIG. 3.

Once an initial selection has been made from any of the four types of accounts, the process 31 determines (48) whether this will generate sufficient funds to satisfy the Net Target Amount. If not, then the process 31 reduces (49) the Net Target Amount by proceeds from selected tax lot(s) (where applicable) or account(s) and selects an additional tax lot/account from which to withdraw funds, reducing the Net Target Amount for this next run through the process by the after-tax proceeds generated from the prior run. If the taxable account is selected and the after-tax proceeds from the sale of the tax lot that will generate the smallest gain are insufficient to meet the Net Target Amount, the process 31 will select the tax lot (of the Designated Security, if any) that will generate the second smallest gain. This process will be repeated until the aggregate proceeds are sufficient to meet the Net Target Amount, with each succeeding iteration selecting the remaining tax lot that would generate the smallest gain.

After running the process enough times to generate sufficient proceeds, the process outputs (50) (e.g., by displaying on the user's computer screen), all of the selected tax lots and/or accounts in the selected Eligible Account(s) from which withdrawal of funds may be made to maximize federal income tax efficiency.

Thus, process 31 illustrated in FIG. 2 lists withdrawal of funds from accounts based on the following hierarchy:

1. Assets in accounts with basis (i.e., taxable accounts and non-deductible tax-deferred accounts) should be liquidated before assets in accounts without basis (i.e., deductible tax-deferred accounts and tax exempt-accounts).

2. Selection between taxable accounts and non-deductible tax-deferred accounts and the tax lots therein is made on a case-specific basis.

3. After the taxable account and non-deductible tax-deferred account have been liquidated, there is no advantage under current federal income tax law to prioritizing between the two no-basis accounts (i.e., tax-exempt and deductible tax-deferred accounts).

This withdrawal hierarchy is based solely on United States federal income tax consequences. In other implementations, other processes (e.g., software programs) may operate to take into consideration other factors, such as asset diversification and asset risk, which may be important to a customer in deciding from which accounts to withdraw funds. In addition, the asset withdrawal planning program 30 that implements process 31 may be used as a tool by a professional financial advisor to assist him or her in developing a withdrawal strategy for a customer or by a customer service representative to assist the customer in developing the customer's withdrawal strategy.

There are at least two reasons why assets held in accounts with basis (i.e., the taxable account and the non-deductible tax-deferred account) should be liquidated before assets held in accounts without basis (i.e., the deductible tax-deferred account and the tax-exempt account). In the case of the non-deductible tax-deferred account, the reason is that the effective tax rate will increase over time, assuming the account appreciates, due to the "time value of basis." Basis can be viewed as a varying adjustment to the tax rate; for example, if the basis of securities in the non-deductible tax-deferred account is 50% of their value, the effective tax rate initially is 17.5% (assuming an ordinary income tax rate of 35%). As the securities in the non-deductible tax-deferred account appreciate, however, the basis will remain constant, and so the effective tax rate will increase. For example, if the basis becomes only 25% of the value due to appreciation, the effective tax rate will increase to 26.25%.

For the taxable account, the time value of basis may or may not result in a decision to liquidate the account before the accounts without basis. Because the taxable account will generate current tax liability from dividends and sales, basis will not remain constant but rather will increase, assuming dividends and sale proceeds are reinvested. Whether the effective tax rate will increase over time is a function of the appreciation (or depreciation) of value relative to the "appreciation" of basis. For example, if a security in a taxable account initially has a basis of zero, any basis-generating transaction will decrease the effective tax rate. Nevertheless, because any decrease in the effective tax rate will only be realized in the future when the securities in the taxable account with the basis are sold, while the event giving rise to that basis is transaction that generates a current tax liability, the overall timing detriment will favor a current sale of securities in the taxable account. For example, assume an individual owns mutual fund shares with a basis of $100 and a value of $1,000. Any liquidation of shares (assuming a single tax lot) would be taxed at an effective rate of 13.5%. If the mutual fund pays a $100 capital gain dividend, the individual will have a $15 tax liability. If the individual reinvests the after-tax proceeds, the mutual fund shares will now have a basis of $185 and a value of $985. The built-in gain in the shares therefore will have decreased from $900 to $800, decreasing the individual's tax liability by $15 (from $135 to $120) when the shares are sold. The individual therefore will have "traded" a current $15 tax liability for a future tax savings of $15. Consequently, the individual will favor a current sale of the securities (versus taking a withdrawal from the account types that do not have basis) even though the effective tax rate on liquidation as a result of the dividend will decrease to 13.3% (assuming a single tax lot).

One way to select between tax lots in a taxable account and a non-deductible tax-deferred account is to calculate the total after-tax liquidation value of the customer's taxable and non-deductible tax-deferred accounts assuming (i) a single withdrawal of a tax lot from a taxable account (of a Designated Security, if any) that will generate the smallest (or zero) gain and (ii) a single withdrawal from non-deductible tax-deferred account that will generate the same amount of after-tax proceeds as the withdrawal from the taxable account, and then (iii) compare the results. For simplicity, the following comparison assumes that the taxable account has a single tax lot and that the value of each account exceeds the amount that must be withdrawn to obtain the after-tax proceeds the customer wishes to receive (W), which in this case is equal to the Net Target Amount.

For example, suppose that the value (i.e., principal) of a taxable account is $P_T$, the effective tax rate on withdrawal is $t_{wt}$, the effective tax rate on liquidation is $t_{wtl}$, the pre-tax withdrawal amount is $W_T$, the initial basis is $B_T$, and the basis allocable to a first withdrawal is $B_{WT}$. Also suppose the initial value (i.e., principal) of the non-deductible tax-deferred account is $P_N$, the effective tax rate on withdrawal is $t_{wn}$, the effective tax rate on liquidation is $t_{wnl}$, the pre-tax withdrawal amount is $W_N$, the initial basis is $B_N$, and the basis allocable to a first withdrawal is $B_{WN}$. For both accounts, the annual rate of return is r, the number of years to liquidation after the partial withdrawal is n, the capital gains tax rate (e.g., 15%) is $t_{cg}$ and the tax rate on ordinary income (e.g., 35%) is $t_i$.

The effective tax rate $t_{wt}$ on a partial withdrawal from the taxable account 22 is:

$$t_{wt} = t_{cg}(1-(B_T/P_T))$$

The required pre-tax amount of withdrawal $W_T$ from the taxable account 22 to obtain W after-tax dollars is:

$$W_T = W/[1-(t_{cg}(1-(B_T/P_T)))] = W/(1-t_{wt})$$

Consequently, if the basis of the taxable account is equal to its value, there will be no tax on the withdrawal and the amount to withdraw will equal W. If the basis equals zero, it will be necessary to withdraw $W/(1-t_{cg})$. Otherwise, the amount to withdraw will be somewhere between these two numbers.

The basis of withdrawal $B_{WT}$ is given by the formula $B_{WT} = B_T(W_T/P_T)$, as only a fraction of the overall basis is withdrawn as part of the withdrawal.

Thus, the total after-tax liquidation value of the customer's taxable account after an initial partial withdrawal of an after-tax amount W from the taxable account may be calculated using the following formula:

$$[(P_T-W_T)(1+r)^n] - [[[(P_T-W_T)(1+r)^n] - (B_T-B_{WT})](t_{cg})],$$

where $[(P_T-W_T)(1+r)^n]$ is the remainder of the principal after the withdrawal plus growth at rate r and $[[[(P_T-W_T)(1+r)^n] - (B_T-B_{WT})](t_{cg})]$ is the capital gains tax paid on the liquidation of the account.

This formula actually overstates the post-liquidation after-tax value of the taxable account, however, because the taxable account (alone among the four types of accounts) will generate a current tax liability and the return, r, has not been reduced by this current tax liability (also, the basis of the taxable account has not been increased in respect of this tax liability). The current liability will be generated not only by interest, dividends and mutual fund distributions but also by sales of securities (e.g., to rebalance holdings among different asset classes so that they adhere to a specified percentage of the overall portfolio). Assuming reinvestment of both dividends and proceeds of sales (e.g., due to rebalancings), the taxable distributions and sales will give rise to basis.

The return on the taxable account actually consists of three components:

| | |
|---|---|
| $r_{ug}$ | Portion of return that is unrealized gain. |
| $r_i$ | Portion of return that is realized taxable ordinary income. |
| $r_{cg}$ | Portion of return that is realized taxable capital gain (from sales and capital gain dividends). |

Applying the applicable tax rate to each of these components, the pre-tax value of the taxable account immediately prior to the liquidation can be re-written as follows:

$$[(P_T-W_T)[1+r_{ug}+((r_{cg})(1-t_{cg}))+((r_i)(1-t_i))]^n]$$

Since the tax liability will generate additional basis if the after-tax portion of the taxable capital gain and ordinary income proceeds are reinvested, however, this too needs to be factored into the calculation. For any period, the basis increase attributable to current tax liability can be expressed as a function of (1) the taxable portion of the rate of return ($r_{cg}$ and $r_i$) and (2) the value of taxable account at the beginning of the period. The basis increase for the next period is determined the same way, except that the value of the account at the beginning of the period must be increased not only by $r_{cg}$ and $r_i$ for the prior period by also by $r_{ug}$ for the prior period. The total basis increase over n will equal the sum of all of the basis increases for all of the calculation periods during n.

As a simple example, assume the value of the taxable account (after the initial withdrawal) is 100, r is 7%, $r_{cg}$ is 1%, and $r_i$ is 1% ($r_{ug}$ is 5%). The basis increase for year 1 equals the after-tax capital gain proceeds $(1-(1\times0.15))$, or 0.85, plus the after-tax ordinary income proceeds $(1-(1\times0.35))$, or 0.65; thus, the basis increase for year 1 is 1.5, and the basis at the end of year 1 is 101.50, while the value of the taxable account has increased to 107. The basis increase for year 2 equals the after-tax capital gain proceeds $(1.07-(1.07\times0.15))$, or 0.91, plus the after-tax ordinary income proceeds $(1.07-(1.07\times0.35))$, or 0.70; thus, the basis increase for year 2 is 1.61 and the basis at the end of year 2 is 103.11, while the value of the taxable account has increased to 114.49.

More generally, the basis increase can be expressed as follows:

$$[(r_{cg}(1-t_{cg})) + (r_i(1-t_i))]\left[\sum_{i=1}^{n}(P_T-W_T)(1+r_{ug}+(r_{cg})(1-t_{cg})+(r_i)(1-t_i))^{i-1}\right]$$

The term in brackets containing the summation represents the value of the taxable account at the beginning of each period; in effect, the value of the taxable account after the initial withdrawal is being multiplied by the after-tax rate of return over n−1 periods (the value of the taxable account at the end of the prior period equals the value of the taxable account at the start of the current period). The term in brackets prior to the summation term multiplies the after-tax taxable rate of return by the balance of the taxable account at the start of the current period to generate the basis increase for the current period. The calculation is repeated and the results added for the periods 1 through n to determine the total basis increase over n.

Factoring this basis increase into the calculation of the post-liquidation after-tax value of the taxable account produces the following result:

(1)−[[(1)−(2)]($t_{cg}$)], where (1) is $[(P_T-W_T)[1+r_{ug}+((r_{cg})(1-t_{cg}))+((r_i)(1-t_i))]^n]$ and (2) is $(B_T - B_W) + \left[ [(r_{cg}(1 - t_{cg})) + (r_i(1 - t_i))] \sum_{i=1}^{n} (P_T - W_T)(1 + r_{ug} + (r_{cg})(1 - t_{cg}) + (r_i)(1 - t_i)^{i-1} \right]$ If the initial withdrawal is from non-deductible tax-deferred account rather than from the taxable account, then the after-tax post-liquidation value of taxable account is:

(1*)−[[(1*)−(2*)]($t_{cg}$)], where (1*) is $[(P_T)[1+r_{ug}+((r_{cg})(1-t_{cg}))+((r_i)(1-t_i))]^n]$ and (2*) is $\left[ (B_T) + [(r_{cg}(1 - t_{cg})) + (r_i(1 - t_i))] \sum_{i=1}^{n} (P_T)(1 + r_{ug} + (r_{cg})(1 - t_{cg}) + (r_i)(1 - t_i))^{i-1} \right] (t_{cg})$ (i) Calculation of Total Liquidation Value when Initial Withdrawal is Made from the Taxable Account.

The total after-tax liquidation value of a non-deductible tax-deferred account assuming a first withdrawal of the after-tax amount W from the taxable account can be calculated using the following formula:

$[(P_N)(1+r)^n]-[[[P_N(1+r)^n]-(B_N)](t_i)]$ where $[(P_N)(1+r)^n]$ is the principal of the non-deducible tax-deferred account plus growth at rate r for n years and $[[[P_N(1+r)^n]-(B_N)](t_i)]$ is the income tax paid on the withdrawal from the non-deductible tax-deferred account minus the basis.

For the first withdrawal of the after-tax amount W from the taxable account, the total after-tax liquidation value of both a taxable account (from which an initial withdrawal is assumed to have been made) and a non-deductible tax-deferred account (from which no withdrawal is assumed to have been made) as the sum of the previous formulae as follows:

(1)−[[(1)−(2)]($t_{cg}$)]+[$(P_N)(1+r)^n$−[[[$P_N(1+r)^n$]−($B_N$)]($t_i$)], where (1) and (2) have the values set forth above.

(ii) Calculation of total liquidation value when initial withdrawal is made from the non-deductible tax-deferred account.

The effective tax rate $t_{wn}$ for the initial withdrawal from the non-deductible tax-deferred account is:

$t_{wn}=t_i(1-B_N/P_N)$

Note that this rate $t_{wn}$ is different from a tax rate $t_{wnl}$ that will apply to subsequent liquidations. The required pre-tax withdrawal $W_N$ from the non-deductible, tax-deferred account can be expressed as follows:

$W_N=W/[1-(t_i(1-(B_N/P_N)))]=W/(1-t_{wn})$

Consequently, if the basis of the non-deductible tax-deferred account 22 is equal to its value, there will be no tax on the withdrawal and the amount to withdraw will equal W. If the basis equals zero, it will be necessary to withdraw W/(1−$t_i$). Otherwise, the amount to withdraw will be somewhere between these two numbers.

For the non-deductible tax-deferred account, the basis of withdrawal is $B_{WN}$, and may be computed using the formula $B_{WN}=B_N(W_N/P_N)$.

The total after-tax liquidation value of the non-deductible, tax-deferred account for a first withdrawal of an after-tax amount W from the non-deductible, tax-deferred account can be calculated using the following formula:

$[(P_N-W_N)(1+r)^n]-[[[(P_N-W_N)(1+r)^n]-(B_N-B_{WN})](t_i)]$, where $[(P_N-W_N)(1+r)^n]$ is the remainder of the principal in the non-deducible tax-deferred account after the withdrawal plus growth at rate r and $[[[(P_N-W_N)(1+r)^n]-(B_N-B_{WN})](t_i)]$ is the income tax paid on the liquidation of the non-deducible tax-deferred account.

The total after-tax liquidation value of the taxable account assuming a first withdrawal of the after-tax amount W from the non-deducible tax-deferred account can be calculated using the following formula:

(1*)−[[(1*)−(2*)]($t_{cg}$)], where, (1*) and (2*) have the values set forth above.

For a first withdrawal of the after-tax amount W from the non-deductible, tax-deferred account, the total after-tax liquidation value of both the taxable account and non-deducible tax-deferred account is the sum of the previous formulae as follows:

(1*)−[[(1*)−(2*)]($t_{cg}$)]+[$(P_N-W_N)(1+r)^n$−[[[$(P_N-W^N)(1+r)^n$]−($B_N-B_{WN}$)]($t_i$)]

(iii) Comparison

To determine which account to withdraw from first, the asset withdrawal planning program 30 (shown in FIG. 1) calculates and compares the after-tax liquidation values of the taxable and non-deductible tax-deferred accounts assuming (i) an initial withdrawal from the taxable account, and (ii) an initial withdrawal from the non-deductible tax-deferred account, using the following:

(1)−[[(1)−(2)]($t_{cg}$)]+[$(P_N)(1+r)^n$]−[[[$P_N(1+r)^n$]−($B_N$)]($t_i$)]

◇

(1*)−[[(1*)−(2*)]($t_{cg}$)]+[$(P_N-W_N)(1+r)^n$−[[[$(P_N-W_N)(1+r)^n$]−($B_N-B_{WN}$)]($t_i$)

As previously mentioned, the above analysis assumed that each account had only a single tax lot and that the value of each account exceeded the amount that must be withdrawn to generate W. In many cases, however, the taxable account will consist of multiple tax lots, the value of any one of which will not exceed W (i.e., the Net Target Amount). In such cases, process 51 will calculate W as the after-tax proceeds resulting from liquidation of the tax lot that will generate the smallest or zero gain (using the Designated Security, if any); the pre-tax value of this tax lot will equal $W_T$. Process 51 will then calculate $W_N$ with reference to this W and perform the comparison detailed above. Since the W resulting from this liquidation will be less than the Net Target Amount, the comparison will be repeated until sufficient after-tax proceeds are generated to meet the Net Target Amount.

Figure 3:
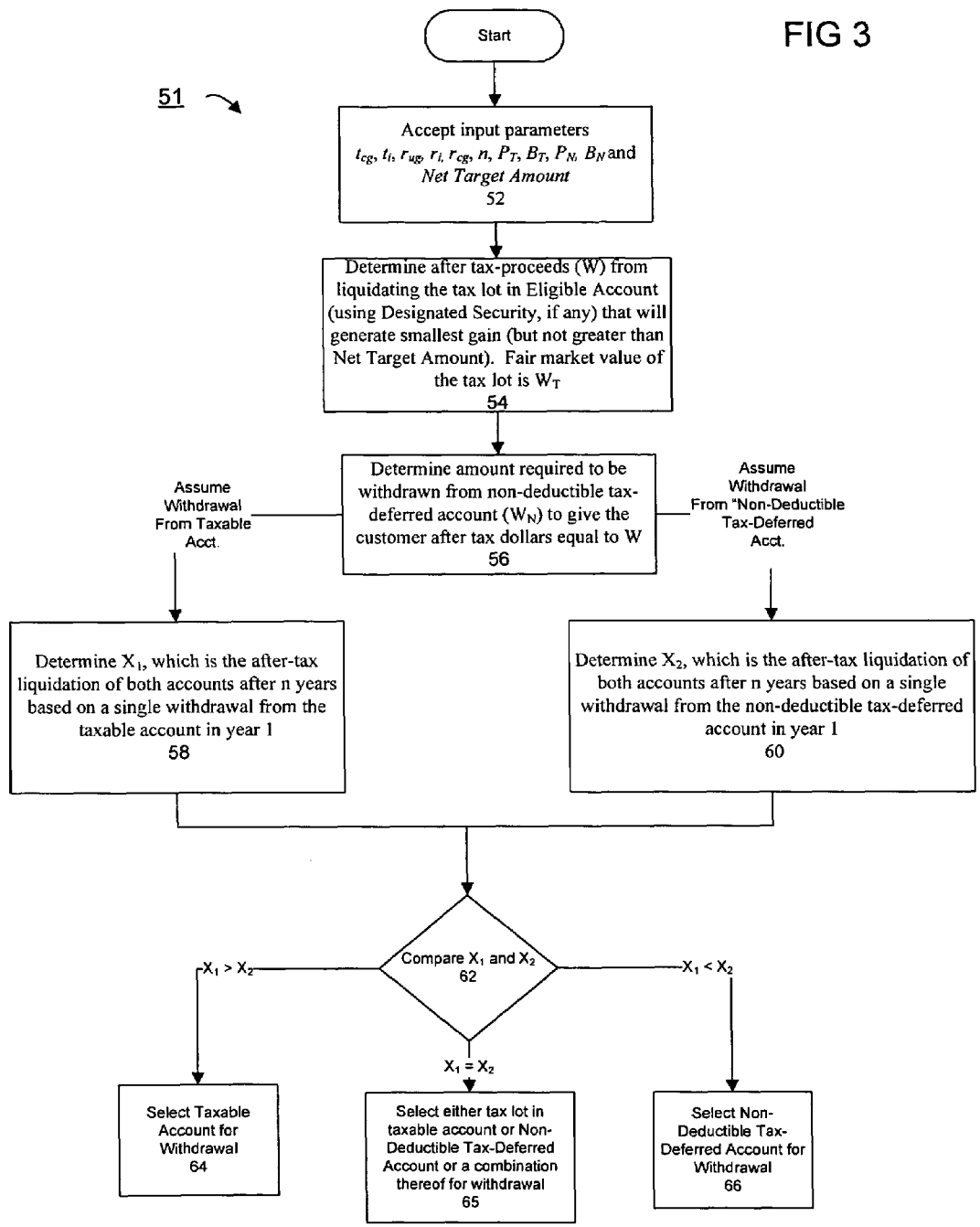
FIG. 3 is a flowchart of a process for selecting between taxable accounts and non-deductible tax-deferred accounts assuming a single withdrawal is made from each type of account.

Referring to FIG. 3, the withdrawal recommendation process 31 (shown in FIG. 2) uses a process 51 to determine either the best tax lot from the eligible taxable account(s) or a corresponding dollar amount in the non-deductible tax-deferred accounts to liquidate resulting in an amount W after-taxes.

Process 51 accepts (52) as input parameters $t_{cg}$, $t_i$, $r_{ug}$, $r_i$, $r_{cg}$, n, $P_T$, $B_T$, $P_N$, $B_N$, and Net Target Amount (each of which are described above) and determines the after-tax liquidation values ($X_1$ and $X_2$) after n years assuming (i) that the tax lot in the taxable account (using the Designated Security, if any) that will generate the smallest gain is selected to provide after-tax funds (W) in year 1 and (ii) that securities in the non-deductible tax-deferred account are selected to provide the same amount of after-tax funds (W) in year 1.

In determining $X_1$ and $X_2$, process 51 determines (54) the after-tax-proceeds (W) from liquidating the tax lot in eligible taxable accounts that will generate smallest gain (but not greater than Net Target Amount), using the Designated Security, if any. If the fair market value of the tax lot exceeds the Net Target Amount, then the fair market value of the shares to be liquidated, $W_T$, may be computed as $W_T=W/(1-t_{wt})$, where W is the Net Target Amount and $t_{wt}$ is the effective tax rate and equals $t_{cg}(1-B_T/P_T)$. If the after-tax proceeds resulting from the liquidation are less than the Net Target Amount, then $W_T$ is the fair market value of the entire tax lot and $W=W_T/(1-t_{wt})$.

Process 51 also determines (56) the amount required to be withdrawn from the non-deductible tax-deferred account ($W_N$) to give the customer after-tax dollars equal to W. As described above, $W_N$ may be computed as $W_N=W/(1-t_{wn})$, where $t_{wn}$ is the effective tax rate and equals $t_i(1-B_N/P_N)$.

Process 51 determines (58) $X_1$ (i.e., the after-tax liquidation value after n years assuming that a tax lot in a taxable account is selected as the one to provide the Net Target Amount in year 1) which may be computed using the above formulae, i.e.,:

$$(1)-[[(1)-(2)](t_{cg})]+[(P_N)(1+r)^n]-[[[P_N(1+r)^n]-(B_N)](t_i)], \text{ where (1) and (2) are set forth above.}$$

Process 51 also determines (60) $X_2$ (i.e., the after-tax liquidation value after n years assuming that the non-deductible tax-deferred account is selected as the one to provide the Net Target Amount in year 1) which may be computed using the above formulae, i.e.,:

$$(1^*)-[[(1^*)-(2^*)](t_{cg})]+[(PN-W_N)(1+r)^n-[[[(P_N-W_N)(1+r)^n-(B_N-B_{WN})](t_i)], \text{ where } (1^*) \text{ and } (2^*) \text{ are set forth above}$$

After computing $X_1$ and $X_2$, process 51 compares (62) $X_1$ and $X_2$. If $X_1>X_2$, then the taxable account is selected (64) as the account from which the withdrawal should be made. If $X_1<X_2$, then the non-deductible tax-deferred account is selected (66) as the account from which the withdrawal should be made. If $X_1=X_2$, then either (65) the taxable account or the non-deductible tax-deferred account or a combination thereof may be selected. Depending on the implementation, process 51 may select securities in the non-deductible tax-deferred account to be liquidated (if that account is selected (66)) or require the customer or financial adviser to make such selection.

Note that in determining the amount of gain that a tax lot will generate for purposes of comparing the taxable account to other types of accounts, process 51 will reduce gain that otherwise would be recognized by the amount of any CLCs that are part of the input 32, beginning with the tax lot (of the Designated Security, if any), that would generate the smallest gain prior to application of the CLC (provided that the gain cannot reduced below zero). For example, if a tax lot had a basis of $50 and a fair market value of $80, and the customer had a $20 CLC, the process 51 would treat the built-in gain on the tax lot as $10 for proposes of performing the comparison analysis.

To illustrate operation of process 51, suppose a customer starts with $300,000 ($=P_T$) in a taxable account with a single tax lot having a basis of $30,000 ($=B_T$) and $500,000 ($=P_N$) in a non-deductible, tax-deferred account having a basis of $50,000 ($=B_N$), and estimated annual pre-tax rate of return is 7%, consisting of an unrealized gain component of 5% ($=r_{ug}$), a realized ordinary income component of 1% ($=r_i$) and a realized capital gain component of 1% ($=r_{cg}$), and that the customer desire $50,000 in after-tax proceeds (=Net Target Amount) in year 1 and plans to liquidate both accounts in full after 20 years (=n). Process 51 computes the amount required to be withdrawn from each account to give the customer the desired $50,000 in after-tax dollars as follows:

$W_T$ (taxable acct.): $57,803=$50,000/[1-[0.15×((1-(30,000/300,000))]]

$W_N$ (non-deductible, tax-deferred acct.): $72,992=$50,0001[1-[0.35×((1-(50,000/500,000))]]

Process 51 computes the after-tax liquidation of both accounts after 20 years assuming that the taxable account is selected as the one to provide the $50,000 in after-tax dollars in year 1 as $2,025,340 ($X_1$) using the formula $(1)-[[(1)-(2)](t_{cg})]$ to determine the after-tax liquidation value of the taxable account ($750,193), using the formula $[(P_N)(1+r)^n]-[[[P_N(1+r)^n]-(B_N)](t_i)]$ to determine the after-tax liquidation value of the non-deductible tax-deferred account ($1,275,147) and then adding the two values. Thus, the total liquidation value of both accounts after 20 years assuming an initial withdrawal from the taxable account is $750,193+$1,275,147=$2,025,340 ($X_1$).

Process 51 also computes the after-tax liquidation of both accounts after 20 years assuming that the non-deductible tax-deferred account is selected as the one to provide the $50,000 in after-tax dollars in year 1 as $2,018,231 ($X_2$) using the formula $(1^*)-[[(1^*)-(2^*)](t_{cg})]$ to determine the after-tax liquidation value of the taxable account ($929,237), using the formula $[(P_N-W_N)(1+r)^n-[[[(P_N-W_N)(1+r)^n]-(B_N-B_{WN})](t_i)]$ to determine the after-tax liquidation value of the non-deductible tax-deferred account ($1,088,995) and then adding the two values.

Thus, the total liquidation value of both accounts after 20 years assuming an initial withdrawal from the non-deductible tax-deferred account is $929,237+$1,275,147=$2,018,231 ($X_2$).

Process 51 compares $X_1$ and $X_2$, and, in this example, selects the taxable account for first withdrawal since that choice yields a higher total liquidation value (i.e., $X_1>X_2$).

As a second example, suppose the input parameters are the same as the first example except that the initial basis of the taxable account is $250,000 and the initial basis of the non-deductible tax-deferred account is $415,000.

In this case, process 51 computes the amount required to be withdrawn from each account to give the customer the desired $50,000 in after-tax dollars as follows:

$W_T$ (taxable acct.)=$51,282=$50,000/[1-[0.15×((1-(250,000/300,000))]]

$W_N$ (non-deductible tax-deferred acct.)=$53,163=$50,000/[1-[0.35×((1-(415,000/500,000))]]

Process 51 computes the after-tax liquidation of both accounts after 20 years assuming that the taxable account is selected as the one to provide the $50,000 in after-tax dollars in year 1 as $2,200,649 ($X_1$) using the formula $(1)-[[(1)-(2)](t_{cg})]$ to determine the after-tax liquidation value of the taxable account ($797,752), using the formula $[(P_N)(1+r)^n]-$ $[[[P_N(1+r)^n]-(B_N)](t_i)]$ to determine the after-tax liquidation value of the non-deductible tax-deferred account ($1,402,897) and then adding the two values.

Thus, the total liquidation value of both accounts after 20 years assuming an initial withdrawal from the taxable account is $797,752+$1,402,897=$2,200,649 ($X_1$).

Process 51 also computes the after-tax liquidation of both accounts after 20 years assuming that the non-deductible, tax-deferred account is selected as the one to provide the $50,000 in after-tax dollars in year 1 as $2,215,969 ($X_2$) using the formula $(1^*)-[[(1^*)-(2^*)](t_g)]$ to determine the after-tax liquidation value of the taxable account ($962,237), using the formula $[(P_N-W_N)(1+r)^n-[[[(P_N-W_N)(1+r)^n]-(B_N-B_{WN})](t_i)]$ to determine the after-tax liquidation value of the non-deductible tax-deferred account ($1,253,732) and then adding the two values.

Thus, the total liquidation value of both accounts after 5 years assuming an initial withdrawal from the taxable account is $962,237+$1,253,732=$2,215,969 ($X_2$).

Process 51 compares $X_1$ and $X_2$, and, in this example, selects the non-deductible tax-deferred account for first withdrawal since that choice yields a higher total liquidation value (i.e., $X_2 > X_1$).

Referring again to FIG. 2, process 31 does not prioritize between a deductible tax-deferred account and the tax-exempt account because the order in which amounts are withdrawn from a tax-exempt account and a deductible tax-deferred account will not affect the after-tax liquidation value of both accounts after n years.

For example, consider a customer who wishes to generate the same amount of after-tax proceeds (W) from a deductible tax-deferred account (e.g., accounts 26a-26b shown in FIG. 1) or a tax-deferred account (e.g., account 27 shown in FIG. 1), then fully liquidate both accounts n years later. The deductible tax-deferred account has a starting balance of $P_Q$ and the tax-exempt account has a starting balance of $P_R$. Since the tax rates on withdrawals will differ (0% for the tax-exempt account and $t_i$ for deductible tax-deferred account), the pre-tax amounts withdrawn from the two accounts ($W_R$ and $W_Q$, respectively) will differ as well. The customer must withdraw $W_Q=W/(1-t_i)$ from the deductible tax-deferred account to obtain W after-tax dollars. For the tax-exempt account, the withdrawal amount ($W_R$) is equal to W since withdrawals from the tax-exempt account are tax-free.

The following formula compares the result produced by withdrawing an amount ($W_R$) from the tax-exempt account (left side) to the result produced by withdrawing an amount ($W_Q$) from the deductible tax-deferred account (right side).

$$[P_Q(1+r)^n(1-t_i)]+[(P_R-W_R)(1+r)^n]$$

$$< >$$

$$[(P_Q-W_Q)(1+r)^n(1-t_i)]+[P_R(1+r)^n]$$

where the term $[P_Q(1+r)^n(1-t_i)]$ is the after-tax return from the deductible tax-deferred account assuming no initial withdrawal, the term $[(P_R-W)(1+r)^n]$ is the after-tax return from the tax-exempt account assuming an initial withdrawal, the term $[(P_Q-W_Q)(1+r)^n(1-t_i)]$ is the after-tax return from the deductible tax-deferred account assuming an initial withdrawal, and the term $[P_R(1+r)^n]$ is the after-tax return from the tax-exempt account assuming no initial withdrawal.

Since $W_Q=W/(1-t_i)$, the above formula may be rewritten as follows:

$$[P_Q(1+r)^n(1-t_i)]+[P_R-W)(1+r)^n]$$

$$< >$$

$$[(P_Q-(W/(1-t_i)))(1+r)^n(1-t_i)]+[P_R(1+r)^n]$$

Multiplying the term ($P_R-W$) by $(1+r)^n$ on the left side and then separately multiplying the term ($P_Q-(W/(1-t_i))$) by $(1+r)^n(1-t_i)$ on the right side yields the following:

$$P_Q(1+r)^n(1-t_i)+P_R(1+r)^n-W(1+r)^n$$

$$< >$$

$$P_Q(1+r)^n(1-t_i)-W/(1-t_i)(1+r)^n(1-t_i)+P_R(1+r)^n$$

The above formula reduces to $-W(1+r)^n=-W(1+r)^n$, and, accordingly, the customer has the same estimated monetary value after liquidating both accounts irrespective of whether the initial withdrawal comes from the tax-exempt account or the deductible tax-deferred account, regardless of the starting balance in each account, the rate of return, the tax rate on the account (although this item will affect the amount of the withdrawal from that account) and the period until liquidation.

To illustrate this principle, assume that a customer starts with $500,000 in a deductible tax-deferred account, $200,000 in a tax-exempt account, the customer wants to obtain $60,000 of after-tax proceeds, the customer plans to liquidate both accounts in full after 5 years, and the estimated annual pre-tax rate of return is 10%. The amount the customer would need to withdraw from each account to obtain $60,000 after-tax dollars is as follows:

Deductible Tax-Deferred Account: $92,308=$60,000/(1-0.35);

Tax-Exempt Account: $60,000.

If the customer withdraws $92,308 from the deductible tax-deferred account in year 1, the result of liquidating both accounts after 5 years is as follows:

| | | |
|---|---|---|
| Value of Deductible, Tax-Deferred Acct. after 5 Years: | $656,592 | (10% apprec. on $407,692) |
| Tax (paid at year 5): | (229,807) | At 35% |
| After-Tax Proceeds | 426,785 | |
| Value of Tax Exempt Acct. after 5 Years: | $322,102 | (10% apprec. on $200,000) |
| Total After-Tax Proceeds: | $748,887 | |

If the customer withdraws $60,000 from the tax-exempt account in year 1, the result of liquidating both accounts after 5 years is as follows:

| | | |
|---|---|---|
| Value of Tax Exempt Acct. after 5 Years: | $805,255 | (10% apprec. on $500,000) |
| Tax (paid at year 5): | (281,839) | At 35% |
| After-tax Proceeds | 523,416 | |
| Value of Deductible, Tax-Deferred Acct. after 5 Years: | $225,471 | (10% apprec. on $140,000) |
| Total After-Tax Proceeds: | $748,887 | |

Accordingly, the estimated after-tax proceeds from liquidating the accounts are identical whether or not the customer withdraws first from the deductible tax-deferred account or the tax-exempt account. As previously mentioned, other factors—such as expectations about future tax rates.—may cause a customer or financial advisor to prioritize between the accounts.

Referring again to FIG. 2, process 31 prioritizes withdrawal from a taxable account over both the tax-exempt account and the deductible tax-deferred account. Process 31 prioritizes withdrawals from the taxable account because it is always, advantageous from purely a federal income tax perspective to liquidate the taxable account over either the tax-exempt account or the deductible tax-deferred account.

For example, the following formula compares the result produced by making a first withdrawal from the taxable account with a single tax lot (left side) to the result produced by making the first withdrawal from the deductible tax-deferred account (right side), assuming initially that the taxable account does not generate any current tax liability:

$$[(P_T-W_T)(1+r)^n]-[[[(P_T-W_T)(1+r)^n]-(B_T-B_W)](t_{cg})]+[P_Q(1+r)^n(1-t_i)]$$

$$<\,>$$

$$[(P_T)(1+r)^n]-[[[(P_T)(1+r)^n]-(B_T)](t_{cg})]+[(P_Q-W_Q)(1+r)^n(1-t_i)]$$

Multiplying $t_{cg}$ against $[[(P_T-W_T)(1+r)^n]-(B_T-B_W)]$ on the left side of the formula and against $[[(P_T)(1+r)^n]-(B_T)]$ on the right side of the formula produces the following formula:

$$[(P_T-W_T)(1+r)^n]-[t_{cg}(P_T-W_T)(1+r)^n]+[t_{cg}(B_T-B_W)]+[P_Q(1+r)^n(1-t_i)]$$

$$<\,>$$

$$[(P_T)(1+r)^n]-[t_{cg}(P_T)(1+r)^n]+[t_{cg}(B_T)]+[P_Q-W_Q)(1+r)^n(1-t_i)]$$

The underlined terms on the left and right side of the formula can be eliminated by factoring out $(P_T-W_T)(1+r)^n$ and $(P_T)(1+r)^n$, respectively. This simplification yields the following formula:

$$[(P_T-W_T)(1+r)^n(1-t_{cg})]+[t_{cg}(B_T-B_W)]+[P_Q)1+r)^n(1-t_i)]$$

$$<\,>$$

$$[(P_T)(1+r)^n(1-t_{cg})]+[t_{cg}(B_T)]+[P_Q-W_Q)(1+r)^n(1-t_i)]$$

Substituting for $W_T$ and $W_Q$ results in the following. $[(P_T-(W/(1-t_{wt})))(1+r)^n(1-t_{cg})]+[t_{cg}(B_T-B_W)]+[P_Q(1+r)^n(1-t_i)]<\,>[(P_T)(1+r)^n(1-t_{cg})]+[t_{cg}(B_T)]+[P_Q-(W/(1-t_i)))(1+r)^n(1-t_i)]$ Multiplying $(P_T-(W/(1-t_{wt})))$ against $(1+r)^n(1-t_{cg})$ and also multiplying $t_{cg}$ against $(B_T-B_W)$ on the left side of the equation and separately multiplying $(P_Q-(W/(1-t_i)))$ against $(1+r)^n(1-t_i)$ on the right side of the equation results in the following:

$$[P_T(1+r)^n(1-t_{cg})]-[(W/(1-t_{wt}))(1+r)^n(1+r)^n(1-t_{cg})]+t_{cg}B_T-t_{cg}B_W+$$

$$[P_Q(1+r)^n(1-t_i)]$$

$$<\,>$$

$$[P_T(1+r)^n(1-t_{cg})]+t_{cg}B_T+[P_Q(1+r)^n(1-t_i)]-[(W/(1-t_i))(1+r)^n(1-t_i)]$$

Some terms cancel, leaving:

$$[-(W/(1-t_{wt}))(1+r)^n(1-t_{cg})]-t_{cg}B_W<\,>-W(1+r)^n, \text{ or}$$

$$-W(1+r)^n[(1-t_{cg})/(1-t_{wt})]-t_{cg}B_W<\,>-W(1+r)^n$$

If there is no basis in the taxable account, then $t_{wt}=t_{cg}$, and $B_W=0$, which causes the two side of the formula to equal each other, meaning that it makes no difference whether the withdrawal is from the taxable account or the deductible, tax-deferred account:

$$-W(1+r)^n[(1-t_{cg})/(1-t_{cg})]-t_{cg}(0)<\,>-W(1+r)^n, \text{ so}$$

$$-W(1+r)^n=-W(1+r)^n$$

If the basis of the taxable account is greater than zero, however, the left side of the formula is larger than the right, which means that it is financially advantageous form a tax perspective to make a first withdrawal from the taxable account:

$$-W(1+r)^n[(1-t_{cg})/(1-t_{wt})]-t_{cg}B_W>-W(1+r)^n$$

This advantage will increase if the taxable account actually generates a current tax liability.

To illustrate the benefit of choosing to withdraw from the taxable account before the deductible tax-deferred account (or the tax-exempt account); assume that the customer has $200,000 in a taxable account with a single tax lot having a basis of $80,000, $500,000 in a deductible tax-deferred account, an estimated annual pre-tax rate of return is 10% (r), and the customer wishes to obtain $60,000 of after-tax proceeds in year 1 and plans to liquidate both the accounts in full after 5 years. The amount the customer would need to withdraw from each account to obtain $60,000 in after-tax dollars in year 1 is as follows:

Taxable acct: $65,934=$60,000/[1−[0.15×((1−(80,000/200,000))]]

Deductible tax-def. acct: $92,308=$60,000/(1−0.35)

If the customer makes the initial withdrawal from the taxable account, the results at the end of year 5 are as follows:

| | | |
|---|---|---|
| Value of Taxable Acct. after 5 Years: | $215,915 | (10% appreciation on $134,066) |
| Basis (at year 5) | (53,626) | |
| Capital Gain | 162,289 | |
| Tax | (24,343) | At 15% |
| After-Tax Proceeds | 191,572 | |
| Value of Deductible Tax-Deferred Acct. after 5 Years | $805,255 | (10% apprec. on $500,000) |
| Tax | (281,839) | At 35% |
| After-Tax Proceeds | 523,416 | |
| Total After-Tax Proceeds: | $714,988 | |

If the customer makes the initial withdrawal from the deductible tax-deferred account, the results at the end of year 5 are as follows:

| | | |
|---|---|---|
| Value of Taxable Acct. after 5 Years | $322,102 | (10% apprec. on $200,000) |
| Basis (in year 5) | (80,000) | |
| Capital Gain | 242,102 | |
| Tax | (36,315) | At 15% |
| After-Tax Proceeds: | 285,787 | |
| Value of Deductible Tax-Deferred Acct. after 5 Years: | $656,592 | (10% apprec. on $407,692) |
| Tax | (229,807) | At 35% |
| After-Tax Proceeds | 426,785 | |
| Total After-Tax Proceeds: | $712,572 | |

Thus, if the taxable account has a basis, a customer will be better off if he or she liquidates the taxable account prior to the deductible tax-deferred account. Even if the taxable account has no basis, the customer will generally be no worse off if the taxable account is liquidated first. Accordingly, process 31 (shown in FIG. 2) prioritizes the taxable account over the deductible tax-deferred account. Moreover, because the deductible tax-deferred account and tax-exempt account are identical from a federal income tax perspective, process 31 also prioritizes the taxable account over the tax-exempt account.

As previously mentioned, other factors—such as portfolio risk, risk of increased/decreased income tax rates, estate planning, state or local taxes, etc.—may cause a customer, financial advisor, or other processes to "override" a selection that prioritizes the taxable account over the deductible tax-deferred account or tax-exempt account.

Referring again to FIG. 2, process 31 prioritizes withdrawal from a non-deductible tax-deferred account over both the tax-exempt account and the deductible tax-deferred account. Process 31 prioritizes withdrawals from the non-deductible tax-deferred account because it is always advantageous from purely a federal income tax perspective to liquidate the non-deductible tax-deferred account over either the tax-exempt account or the deductible tax-deferred account.

For example, the following formula compares the result produced by making a first withdrawal from the non-deductible tax-deferred account (left side) to the result produced by making the first withdrawal from the deductible tax-deferred account (right side):

$$[(P_N-W_N)(1+r)^n]-[[[(P_N-W_N)(1+r)^n]-(B_N-B_{WN})](t_i)]+[P_Q(1+r)^n(1-t_i)]$$

$$<>$$

$$[(P_N)(1+r)^n]-[[[(P_N)(1+r)^n]-(B_N)](t_i)]+[(P_Q-W_Q)(1+r)^n(1-t_i)]$$

Multiplying $t_i$ against $[[(P_N-W_N)(1+r)^n]-(B_N-B_{WN})]$ on the left side of the equation and against $[[(P_N)(1+r)^n]-(B_T)]$ on the right side of the equation yields the following:

$$[(P_N-W_N)(1+r)^n]-[t_i(P_N-W_N)(1+r)^n]+[t_i(B_N-B_{WN})]+[P_Q(1+r)^n(1-t_i)]$$

$$<>$$

$$[(P_N)(1+r)^n]-[t_i(P_N)(1-r)^n]+[t_i(B_N)]+[(P_Q-W_Q)1+r)^n(1-t_i)]$$

Simplifying the underlined terms on the left and right side of the equation by factoring out $(P_N-W_N)(1+r)^n$ and $(P_N)(1+r)^n$, respectively results in the following formula:

$$[(P_N-W_N)(1+r)^n]-[t_i(P_N-W_N)(1+r)^n]+[t_i(B_N-B_{WN})]+[P_Q(1+r)^n(1-t_i)]$$

$$<>$$

$$[(P_N)(1+r)^n]-[t_i(P_N)(1+r)^n]+[t_i(B_N)]+[(P_Q-W_Q)(1+r)^n(1-t_i)]$$

Some terms cancel, leaving:

$$-W_N(1+r)^n(1-t_i)-t_iB_{WN}<>-W_Q(1+r)^n(1-t_i)$$

Substituting for $W_N$ and $W_Q$ results in the following.

$$-(W/(1-t_{wn}))^n(1-t_i)-t_iB_{WN}<>-(W/(1-t_i))(1+r)^n(1-t_i)$$

or $$-W(1+r)^n[(1-t_i)/(1-t_{wn})]-t_iB_W<>-W(1+r)^n$$

If there is no basis in the non-deductible tax-deferred account, then $t_{wn}=t_i$, and $B_N=0$, and so each side of the equation yields the same result, meaning that it makes no difference whether the withdrawal is from the non-deductible tax-deferred account or the deductible tax-deferred account.

If the basis of the non-deductible tax-deferred account is greater than zero, the left side of the equation is larger than the right, and, accordingly, it is financial advantageous from a federal income tax perspective to withdraw from the non-deductible tax-deferred account over the deductible tax-deferred account.

To illustrate the benefit of choosing the non-deductible tax-deferred account over the deductible tax-deferred account, suppose a customer has $500,000 in the deductible tax-deferred account, $200,000 in the non-deductible tax-deferred account and having a basis of $80,000, an estimated annual pre-tax rate of return is 10%, and the customer wishes to obtain $60,000 of after-tax proceeds in year 1 and plans to liquidate both accounts in 5 years. The amount the customer must withdraw in year 1 to obtain $60,000 in after-tax dollars is as follows:

Non-Deductible

Tax-Deferred account: $75,949=$60,000/[1−[0.35×((1−(80,000/200,000))]]

Deductible Tax-Deferred account: $92,308=$60,000/(1−0.35)

If the customer makes an initial withdrawal from the non-deductible tax-deferred account, the results at the end of year 5 are as follows:

| | | |
|---|---|---|
| Value of Non-Deductible Tax-Deferred Acct. after 5 Years: | $199,785 | (10% apprec. on $124,051) |
| Basis | (49,620) | |
| Taxable Distribution | 150,165 | |
| Tax | (52,558) | At 35% |
| After-Tax Proceeds | 147,227 | |
| Value of Deductible Tax-Deferred Acct. after 5 Years: | $805,255 | (10% apprec. on $500,000) |
| Tax | (281,839) | At 35% |
| After-Tax Proceeds | 523,416 | |
| Total After-Tax Proceeds: | $670,643 | |

If instead the customer makes an initial withdrawal from the deductible tax-deferred account, the results at the end of year 5 are as follows:

| | | |
|---|---|---|
| Value of Non-Deductible Tax-Deferred Acct. after 5 Years | $322,102 | (10% apprec. on $200,000) |
| Basis | (80,000) | |
| Taxable Distribution | 242,102 | |
| Tax | (84,736) | At 35% |
| After-Tax Proceeds | 237,366 | |
| Value of Deductible Tax-Deferred Acct. after 5 Years | $656,592 | (10% apprec. on $407,692) |
| Tax | (229,807) | At 35% |
| After-Tax Proceeds | 426,785 | |
| Total After-Tax Proceeds: | $664,151 | |

Thus, if the non-deductible tax-deferred account has a basis, a customer will be better off if he or she liquidates the non-deductible tax-deferred account prior to the deductible tax-deferred account. Even if the non-deductible tax-deferred account has no basis, the customer will generally be no worse off if the non-deductible tax-deferred account is liquidated first. Accordingly, process 31 (shown in FIG. 2) prioritizes the non-deductible tax-deferred account over the deductible tax-deferred account. Moreover, because the deductible tax-deferred account and tax-exempt account are identical from a federal income tax perspective, process 31 also prioritizes the non-deductible tax-deferred account over the tax-exempt account.

As previously mentioned, other factors—such as portfolio risk, risk of increased/decreased income tax rates, estate planning, state or local taxes, etc.—may cause a customer, financial advisor, or other processes to "override" a selection that prioritizes the non-deductible tax-deferred account over the deductible tax-deferred account or tax-exempt account.

The implementation detailed up to this point in the Detailed Description maximizes after-tax proceeds after n years based on a single withdrawal in year 1. This approach is optimal for customers that are making an isolated one-time withdrawal. Many customers, however, will make withdrawals at periodic intervals such as one year rather than only once. In such cases, a comparison of the taxable and non-deductible tax-deferred account based on a single withdrawal may not produce accurate results, because the relationship between the amounts that must be withdrawn from the two types of accounts will change over time, a concept that is not captured by the single-withdrawal method. (The single-withdrawal method will create accurate results for comparisons of all other pairs of accounts.)

Because the basis of a non-deductible tax-deferred account will remain constant over time while the value of the account increases, the effective tax rate on withdrawals from the account will increase over time (the "time value of basis"). Consequently, the pre-tax amount that must be withdrawn to generate a given amount of after-tax proceeds will increase over time. This phenomenon will create an incentive (the "Non-Deductible Tax-Deferred Incentive") to liquidate the non-deductible tax-deferred account as rapidly as possible.

In the case of the taxable account, both the basis (due to reinvestment of the after-tax proceeds from the currently taxable portion of the return) and value will increase over time. These increases will either increase or decrease the effective rate of tax on sales of securities to fund withdrawals in the taxable account. If (1) the ratio of the account's basis to value prior to the increase in basis and value is greater than (2) the ratio of the basis increase to the value increase, then the effective rate of tax on sales/withdrawals will increase over time. If (1) the ratio of the account's basis to value prior to the increase in basis and value is less than (2) the ratio of the basis increase to the value increase, then the effective rate of tax on sales/withdrawals will decrease over time. If the effective tax rate increases over time, the pre-tax amount that must be withdrawn to generate a given amount of after-tax proceeds will increase over time, and this will create an incentive to liquidate the taxable account as rapidly as possible; if the tax rate decreases over time, the pre-tax amount that must be withdrawn to generate a given amount of after-tax proceeds will decrease over time, and this will create an incentive to defer liquidation of the taxable account (collectively with the incentive to liquidate the taxable account as rapidly as possible, the "Taxable Incentive").

The aggregate effect of the Taxable Incentive and the Non-Deductible Tax-Deferred Incentive may or may not be sufficient to change the account withdrawal order that the single-withdrawal method produces. For example, suppose that the single-withdrawal method calculates that selecting the taxable account first will generate slightly more after-tax liquidation proceeds after n years than selecting the non-deductible tax-deferred account. If the effective tax rate on the non-deductible tax-deferred account is expect to increase in the future while the effective tax rate on the taxable account is expected to decrease in the future, then both the Non-Deductible Tax-Deferred Incentive and the Taxable Incentive will favor liquidating the non-deductible tax-deferred account before the taxable account. If the magnitude of the two Incentives is sufficient, this may tip the balance in favor of liquidating the non-deductible tax-deferred account before the taxable account. On the other hand, if the single-withdrawal method had selected the non-deductible tax-deferred account as the first account from which to make a withdrawal, the two Incentives would have reinforced this result.

To address this phenomenon, process 51 can be modified to apply the formulae set forth above for the single withdrawal method by assuming that the customer will make a series of withdrawals at fixed periodic intervals that will generate the same amount of after-tax proceeds ("sequential withdrawals" or "SWP").

Spreadsheets attached at Appendices A-D illustrate the differences between the single withdrawal and sequential withdrawal processes in determining whether to liquidate securities in a taxable account or a non-deductible tax-deferred account for a 20-year period. The spreadsheet at Appendix A assumes that the taxable account has a starting balance of $300,000 and a single tax lot with a basis of $30,000, the non-deductible tax-deferred account has a starting balance of $500,000 and a basis of $50,000 and the customer wants to obtain $50,000 of after-tax proceeds. Appendix A further assumes that the overall rate of return is 7%—consisting of unrealized return of 5%, realized capital gain return of 1% and realized ordinary income return of 1%—and that the tax rates on ordinary income and capital gains are 35% and 15% respectively. Scenarios 1 and 2 compare the effect of a one-time withdrawal from the taxable account and non-deductible tax-deferred account, respectively. In Scenario 1, the customer withdraws $57,803 from the taxable account to generate $50,000 of after-tax proceeds, while in Scenario 2 the customer withdraws $72,993 from the non-deductible tax-deferred account to generate $50,000 of after-tax proceeds. After 20 years, the combined after-tax liquidation value of the two accounts is $2,025,340 in Scenario 1 and $2,018,231 in Scenario 2. Consequently, the taxable account is selected as the account from which to liquidate securities and withdraw the proceeds.

The spreadsheet at Appendix B illustrates the SWP method using the same facts as the spreadsheet at Appendix A except that the customer generates $50,000 of after-tax proceeds every year for twenty years (not just in year 1). In Scenario 3, the customer first takes withdrawals from the taxable account until it is fully liquidated and then takes withdrawals from the non-deductible tax-deferred account. In Scenario 4, the customer takes withdrawals first from the non-deductible tax-deferred account until it is fully liquidated and then takes withdrawals from the taxable account.

After 20 years, the value of the remaining account is $91,744 in Scenario 3 and $93,103 in Scenario 4. Consequently, the non-deductible tax-deferred account is selected as the first account from which to liquidate and withdraw proceeds. The spreadsheets at Appendices A and B therefore illustrate how the single-withdrawal method and the SWP method can select different accounts. Based on the facts in Scenarios 3 and 4, the effective rate of tax on the taxable account decreases over time while the effective rate of tax on the non-deductible tax-deferred account increases over time. Both the Taxable Incentive and the Non-Deductible Tax-Deferred Incentive therefore favor liquidating the non-deductible tax-deferred account before the taxable account, and in this case the magnitude of the two Incentives is sufficient to tip the balance in favor of liquidating the non-deductible tax-deferred account first.

In other cases, the single-withdrawal method and SWP method will reach the same result. The spreadsheet at Appendix C illustrates the single-withdrawal method using the same facts as the spreadsheet at Appendix A except that the taxable account has a single tax lot with a basis of $50,000 rather than $30,000. In Scenario 5, the customer withdraws $57,143 from the taxable account to generate $50,000 of after-tax proceeds, while in Scenario 6 the customer withdraws $72,993 from the non-deductible tax-deferred account to generate $50,000 of after-tax proceeds. After 20 years, the combined after-tax liquidation value of the two accounts is $2,029,815 in Scenario 5 and $2,021,231 in Scenario 6. Consequently, the taxable account is selected as the account from which to liquidate securities and withdraw the proceeds.

The spreadsheet at Appendix D illustrates the SWP method using the same-facts as the spreadsheet at Appendix A except that the customer generates $50,000 of after-tax proceeds every year for twenty years (not just in year 1). In Scenario 7, the customer first takes withdrawals from the taxable account until it is fully liquidated and then takes withdrawals from the non-deductible tax-deferred account. In Scenario 8, the customer takes withdrawals first from the non-deductible tax-deferred account until it is fully liquidated and then takes withdrawals from the taxable account.

After 20 years, the value of the remaining account is $101,350 in Scenario 7 and $97,616 in Scenario 8. Consequently, the taxable account is selected as the first account from which to liquidate and withdraw proceeds. The spreadsheets at Appendices C and D therefore illustrate how the single-withdrawal method and the SWP method can select same account. Based on the facts in Scenarios 7 and 8, the effective rate of tax on the taxable account decreases over time—but at a slower rate than in Scenarios 3 and 4—while the effective rate of tax on the non-deductible tax-deferred account increases over time—at the same rate as in Scenarios 3 and 4. Both the Taxable Incentive and the Non-Deductible Tax-Deferred Incentive therefore favor liquidating the non-deductible tax-deferred account before the taxable account, but in this case the magnitude of the two Incentives is not sufficient to tip the balance in favor of liquidating the non-deductible tax-deferred account first.

The implementation illustrated by the spreadsheets at Appendices B and D compares the results of two different systematic withdrawal patterns: (1) withdrawals from the taxable account until it is depleted followed by withdrawals from the non-deductible tax-deferred account, and (2) withdrawals from the non-deductible tax-deferred account until it is depleted followed by withdrawals from the taxable occurs. Many other systematic withdrawal patterns are possible, however. For example, amounts could be withdrawn in odd years from the taxable account and in even years from the non-deductible tax-deferred account, or visa versa (in each case until one of the accounts was depleted, at which point the alternating would cease). Other implementations therefore may consider some or all of the possible permutations of withdrawal patterns in determining which SWP pattern will maximize after-tax liquidation proceeds.

A number of embodiments of the invention have been described. Nevertheless, it will be understood that various modifications may be made without departing from the spirit and scope of the invention. For example, a uniform estimated rate of return (e.g., 10% pre-tax rate of return) has been assumed in the processes illustrated in FIGS. 2 and 3. Other implementations, however, may use a more sophisticated estimated rate of return such as one that is specific to an asset held in an account (e.g., a historic rate of return for small-cap mutual funds held in an account). Other implementations also may address employer stock held in a tax-deferred account, treating such stock as if it were held in a taxable account but applying a special tax rate to the sale of such stock in certain circumstances.

The techniques described above need not apply exclusively to determine from which retirement accounts to withdraw funds, but may also be applied to determining a withdrawal strategy from other types of accounts, such as accounts set aside for education that have similar tax effects as retirement accounts (e.g., Coverdale Education Savings Accounts and Section 529 Plan accounts).

Accordingly, other embodiments are within the scope of the following claims.

What is claimed is:

1. A method of selecting an account from which to withdraw funds sufficient to yield a target amount of after-tax funds, the method comprising:

by machine, determining a first future after-tax liquidation value of assets held in one or more taxable accounts and one or more non-deductible tax-deferred accounts assuming that one or more withdrawals of the target amount are made from the taxable accounts prior to a withdrawal of funds from the non-deductible tax-deferred accounts;

by machine, determining a second future after-tax liquidation value of assets held in one or more non-deductible tax-deferred accounts and one or more taxable accounts assuming that one or more withdrawals of the target amount are made from the non-deductible tax-deferred accounts prior to a withdrawal of funds from the taxable accounts; and prioritizing withdrawal of funds between the taxable and non-deductible tax-deferred accounts based on the first and second future after-tax liquidation values.

2. The method of claim 1 further comprising:

by machine, prioritizing withdrawal from taxable and non-deductible tax-deferred accounts over accounts having no tax basis.

3. The method of claim 1 wherein prioritizing withdrawal of funds between the taxable and non-deductible tax-deferred accounts comprises:

selecting a withdrawal of the target amount from the taxable accounts prior to the non-deductible tax-deferred accounts if the first future after-tax liquidation value is greater than the second after-tax liquidation value.

4. The method of claim 1 wherein the target amount is a Net Target Amount.

5. The method of claim 1 further comprising:

providing a set of assumptions for determining the first and second after-tax liquidation values.

6. The method of claim 5 wherein the set of assumptions comprises an estimated rate of return, income tax rate, capital gains tax rate, and a number of years for determining the first and second future after-tax liquidation value.

7. The method of claim 5 further comprising:

providing a graphical user interface for inputting one or more assumptions.

8. The method of claim 1 further comprising:

designating one or more securities to liquidate prior to other securities.

9. The method of claim 8 further comprising:

determining the first and second after-tax liquidation values for only assets held in the taxable and non-deductible tax-deferred accounts that comprise the designated securities.

10. The method of claim 1 wherein the target amount comprises an amount of after-tax proceeds from liquidating a tax lot selected among a plurality of tax lots held the taxable accounts, wherein the selected tax lot is the tax lot the will generate the least taxable gain.

11. The method of claim 10 further comprising:
   by machine, determining an amount required to be withdrawn from the non-deductible tax-deferred account to yield the target amount.

12. A system for selecting an account from which to withdraw funds sufficient to yield a target amount of after-tax funds, the system comprising:
   a data storage device configured to store information about a portfolio of accounts, wherein the portfolio of accounts comprises one or more of the following accounts: taxable accounts, non-deductible tax-deferred accounts; deductible tax-deferred accounts, and tax-exempt accounts;
   a processor in communication with the data storage device, the processor configured to execute instructions that cause the processor to:
      prioritize withdrawal from taxable accounts and non-deductible tax-deferred accounts over withdrawal from deductible tax-deferred accounts and tax-exempt accounts; and
      prioritize withdrawal between taxable accounts and non-deductible tax-deferred accounts based on a comparison of a first and second future after-tax liquidation value of assets held in one or more the taxable accounts and one or more of the non-deductible tax-deferred accounts, wherein the first future after-tax liquidation value assumes that one or more withdrawals of the target amount are made from the taxable accounts prior to a withdrawal of funds from the non-deductible tax-deferred accounts, and the second future-after-tax liquidation values assumes that one or more withdrawals of the target amount are made from the non-deductible tax-deferred accounts prior to a withdrawal of funds from the taxable accounts.

13. The system of claim 12 wherein the target amount is a Net Target Amount.

14. The system of claim 12 wherein the target amount comprises an amount of after-tax proceeds from liquidating a tax lot selected among a plurality of tax lots held the taxable accounts, wherein the selected tax lot is the tax lot the will generate the least taxable gain.

15. The system of claim 14 further including instruction that when executed cause the processor to determine an amount required to be withdrawn from the non-deductible tax-deferred account to yield the target amount.

16. The system of claim 12 further comprising: a memory device containing a set of assumptions upon which to base the determination of the first and second amounts.

17. The system of claim 16 wherein the set of assumptions comprises: an estimated rate of return, income tax rate, capital gains tax rate, and a number of years for determining the first and second future after-tax liquidation value.

18. The system of claim 16 further comprising a graphical user interface configured to permit a user to set at least one variable in the set of assumptions.

19. The system of claim 12 further comprising:
   a server accessible on the network and in communication with the data storage device.

20. The system of claim 19 further comprising:
   a client computer in communication with the server using the network.

21. The system of claim 20 wherein the client computer comprises the processor.

22. The system of claim 20 wherein the server comprises the processor.

23. A computer program product residing on a computer readable medium having instructions stored thereon that, when executed by the processor, cause that processor to:
   determine a first future after-tax liquidation value of assets held in one or more taxable accounts and one or more non-deductible tax-deferred accounts assuming that one or more withdrawals of the target amount are made from the taxable accounts prior to a withdrawal of funds from the non-deductible tax-deferred accounts;
   determine a second future after-tax liquidation value of assets held in one or more non-deductible tax-deferred accounts and one or more taxable accounts assuming that one or more withdrawals of the target amount are made from the non-deductible tax-deferred accounts prior to a withdrawal of funds from the taxable accounts; and
   prioritize withdrawal of funds between the taxable and non-deductible tax-deferred accounts based on the first and second future after-tax liquidation values.

24. The computer product of claim 23 further including instruction that when executed cause the processor to:
   prioritize withdrawal from taxable and non-deductible tax-deferred accounts over accounts having no tax basis.

25. The computer product of claim 23 further including instruction that when executed cause the processor to:
   display a graphical user interface that permits a user to input one or more assumptions for determining the first and second after-tax liquidation values.

26. The computer product of claim 25 wherein the assumptions include one or more of the following: an estimated rate of return, income tax rate, capital gains tax rate, and a number of years for determining the first and second future after-tax liquidation value.

27. The computer product of claim 23 further including instruction that when executed cause the processor to:
   display a graphical user interface that permits a user to designate one or more securities to liquidate prior to other securities.

28. The computer product of claim 27 further including instruction that when executed cause the processor to:
   determine the first and second after-tax liquidation values for only assets held in the taxable and non-deductible tax-deferred accounts that comprise the designated securities.

29. The computer product of claim 23 further including instruction that when executed cause the processor to:
   compute the target amount by determining an amount of after-tax proceeds from liquidating a tax lot selected among a plurality of tax lots held the taxable accounts, wherein the selected tax lot is the tax lot the will generate the least taxable gain.

30. The computer product of claim 29 further including instruction that when executed cause the processor to:
   determine an amount required to be withdrawn from the non-deductible tax-deferred account to yield the target amount.

* * * * *

UNITED STATES PATENT AND TRADEMARK OFFICE
CERTIFICATE OF CORRECTION

PATENT NO. : 7,630,929 B1  Page 1 of 1
APPLICATION NO. : 10/971888
DATED : December 8, 2009
INVENTOR(S) : Stephen D. Fisher, Jonathan F. Weed and Viswanathan Venugopala It is certified that error appears in the above-identified patent and that said Letters Patent is hereby corrected as shown below:

Column 1
Line 9, replace "Jonathan E Weed" with --Jonathan F. Weed--

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,630,929 B1  
APPLICATION NO. : 10/971888  
DATED : December 8, 2009  
INVENTOR(S) : Fisher et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this

Twenty-first Day of December, 2010

David J. Kappos
*Director of the United States Patent and Trademark Office*